United States Patent [19]

Sullivan et al.

[11] 4,061,216
[45] Dec. 6, 1977

[54] GEARBOX DECOUPLER

[75] Inventors: Richard N. Sullivan, Tempe; John E. Vance, Scottsdale, both of Ariz.

[73] Assignee: The Garrett Corporation, Los Angeles, Calif.

[21] Appl. No.: 729,922

[22] Filed: Oct. 6, 1976

Related U.S. Application Data

[63] Continuation of Ser. No. 522,080, Nov. 8, 1974, abandoned.

[51] Int. Cl.$^2$ .................... F16D 11/12; F16D 41/00; F16D 43/28
[52] U.S. Cl. ........................ 192/46; 192/47; 192/65; 192/85 CA
[58] Field of Search .................. 192/46, 47, 53 H, 65, 192/67 A, 85 CA

[56] References Cited

U.S. PATENT DOCUMENTS

| 1,509,446 | 9/1924 | Skinner | 192/47 |
| 1,946,177 | 2/1934 | Neurath | 192/47 X |
| 2,806,567 | 9/1957 | Bonquet | 192/85 CA |
| 2,913,084 | 11/1959 | Short | 192/53 H X |
| 3,070,202 | 12/1962 | Banker | 192/85 CA |
| 3,395,782 | 8/1968 | Clements | 192/67 A |
| 3,715,019 | 2/1973 | Heybourne | 192/67 A |

FOREIGN PATENT DOCUMENTS

| 543,352 | 6/1922 | France | 192/47 |

Primary Examiner—Allan D. Herrmann
Attorney, Agent, or Firm—Herschel C. Omohundro; James W. McFarland; Albert J. Miller

[57] ABSTRACT

This apparatus for coupling and decoupling driving and driven elements includes an overrunning clutch mechanism having complemental parts with members on one part movable in a plane extending radially to the axis of rotation of the parts to engage the members with the second part for effecting a driving connection between the parts, one of the parts being selectively movable axially relative to the elements to interrupt and reestablish the radial registration of the members with the second part, the elements being coupled when registration is established and decoupled when registration is interrupted.

10 Claims, 3 Drawing Figures

GEARBOX DECOUPLER

This is a continuation of application Ser. No. 522,080 filed Nov. 8, 1974, now abandoned.

BACKGROUND OF THE INVENTION

This invention relates generally to motion transmitting mechanism and more particularly to coupling or clutch devices used to connect driving and driven elements. The type of apparatus to which this invention relates is exemplified by the following U.S. Pat. Nos.:

U.S. Pat. No. 842,587 to Skogstad
U.S. Pat. No. 1,611,545 to Maybach
U.S. pat. No. 2,409,009 to Bakke
U.S. Pat. No. 3,638,774 to Burch et al.
U.S. Pat. No. 3,727,733 to Mrazek These patents have certain features of construction which are common to one another as well as to applicant's device, but none has all the features in combination to which the present application is directed. Such combination of features makes possible certain desirable operations which cannot be secured with prior apparatus.

SUMMARY

As previously mentioned, this invention relates generally to motion transmitting mechanism and more particularly to apparatus for coupling and decoupling driving and driven elements. Still more particularly, the invention relates to means for coupling and decoupling a driving element, such as a gas turbine engine or shaft driven thereby, to a gear box from which one or more power take-off shafts extend. Such apparatus is used in aircraft for driving generators, hydraulic pressure pumps and other devices too numerous to list.

An object of this invention is to provide apparatus for coupling and decoupling driving and driven elements having the characteristics of overdriving, i.e., the driven element may operate at a rate faster than the driving element or when the latter is not in operation. Also, the device may be actuated to decouple the driving from the driven element when it is desired to operate the driving element without transmitting motion or power to the driven element.

Another object of this invention is to provide apparatus for coupling and decoupling driving and driven elements, the apparatus having an overrunning clutch and means for connecting and disconnecting such clutch with the driving element at will.

Still another object of this invention is to provide apparatus for coupling and decoupling driving and driven elements, the apparatus having a clutch with complemental parts which cooperate to effect a driving connection between the driving and driven elements when the former is transmitting power to the latter and an overrunning relationship when the rate of operation of the driven element tends to exceed that of the driving element; the apparatus also has means for moving one of the complemental clutch parts to completely disconnect the driven from the driving element when such a relation is found desirable.

A further object of the invention is to provide apparatus for coupling and decoupling driving and driven elements, the apparatus having a pawl and ratchet clutch in which the pawls are carried by a member connected with the driven element for movement in a plane extending radially to the axis of the elements to engage the ratchet which is connected with the driving element and provides a driving connection therebetween, the connection between the ratchet and the driving element being such that the ratchet can be moved to a location where the pawls can no longer engage it, thus uncoupling the elements and permitting the driving element to operate without transmitting power or motion to the driven element.

Other objects and advantages of the invention will be pointed out or made obvious by the following description of one form of coupling apparatus selected for illustration in the accompanying drawings.

THE DRAWINGS

DESCRIPTION

Figure 1:
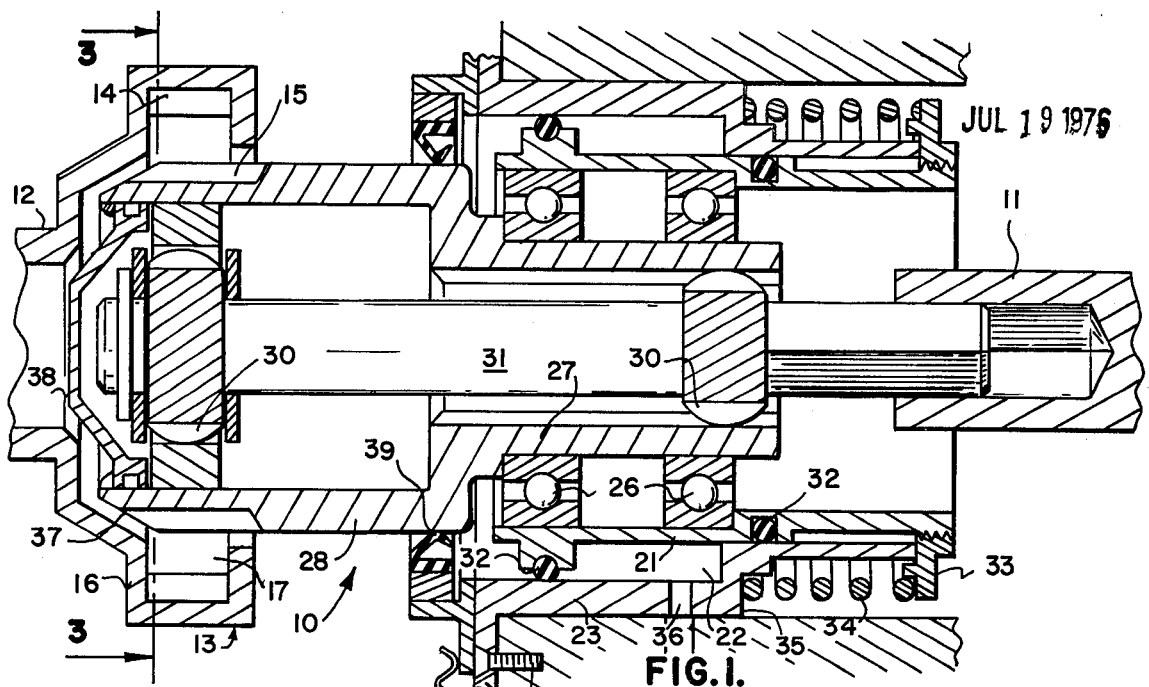
FIG. 1 is an axial sectional view of an apparatus for coupling and decoupling driving and driven elements formed in accordance with the present invention, the apparatus being in a coupling stage.
Figure 2:
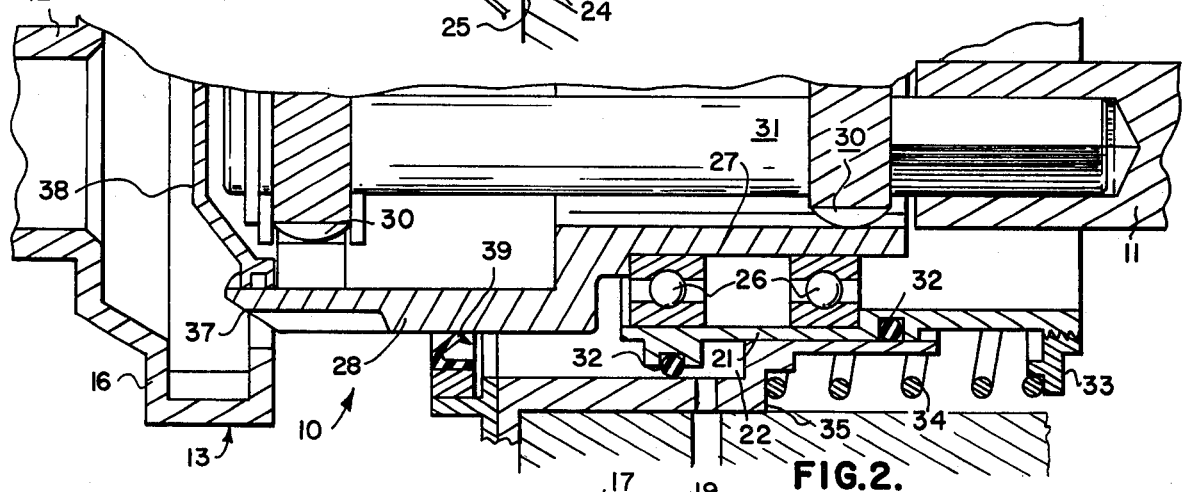
FIG. 2 is a similar view with the apparatus in a decoupling stage.
Figure 3:
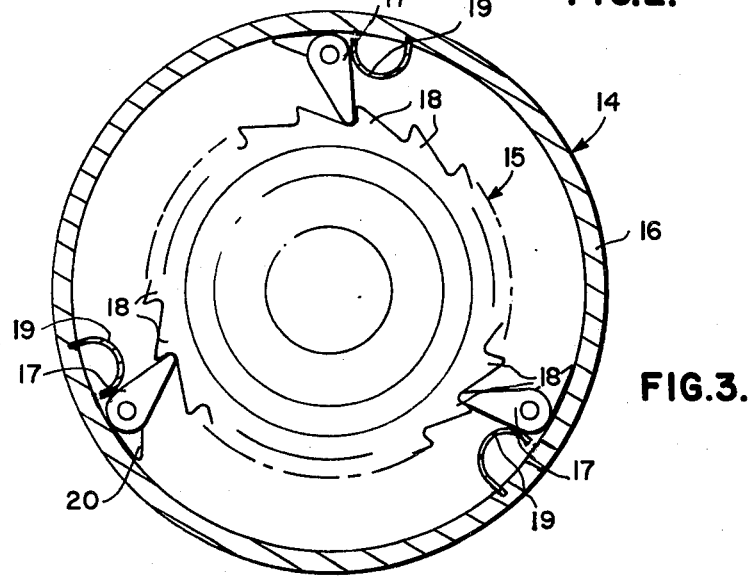
FIG. 3 is a vertical transverse sectional view taken through a clutch forming a part of the apparatus.

Referring more particularly to the drawings, it will be apparent that the coupling and decoupling apparatus 10 of the invention is provided between driving and driven elements, or shafts, 11 and 12. These elements are axially aligned and suitably connected, respectively, with a prime mover or other power source (not shown) and a device to be driven, such as a transmission or gear box (not shown). The apparatus 10 includes a clutch of an overrunning type, designated generally by the numeral 13, which, in this instance, includes two main parts, i.e., a pawl assembly 14 and a ratchet 15. The latter is connected with the driving element 11 while the former is connected with the driven element 12. The pawl assembly 14 includes a circular housing 16 which is suitably connected with the driven shaft, and as shown in FIG. 3, has a plurality of pawls 17 pivotally mounted therein for swinging movement about axes extending parallel to the axis of rotation of the elements 11 and 12. The pawls, therefore, move in planes at right angles or radial to such axis. These pawls engage teeth 18 on the ratchet 15 and transmit force from the ratchet to the housing 16 and consequently to the driven element. Suitable leaf springs 19 urge the pawls 17 inwardly toward the ratched at all times. This inward movement may be limited by suitable stop means 20 formed on the pawls for reasons which will be set forth hereinafter.

It will be obvious that when the apparatus 10 is coupled to effect a driving connection between elements 11 and 12, the ratchet must be in radial registration with the pawl assembly so that the teeth of the ratchet can be engaged by the pawls. To decouple the elements and preclude a driving engagement, the ratchet is moved axially of the elements until the radial registration of the ratchet and pawls is interrupted. This movement is made possible by mounting the ratchet 15 on a piston-like carrier 21 disposed for sliding movement in a cylindrical chamber 22. Chamber 22 is provided in a body 23 secured, as at 24, to a suitable support 25. Carrier 21 has a plurality of antifriction bearings 26 for rotatably supporting a tubular body 27 on one end of which the ratchet proper is supported. The teeth of the ratchet are machined in a second tubular piece 28, body 27 and piece 28 each being formed with internal splines for receiving crowned splines 30 on a shaft extension 31 arranged to rotate with the driving element 11. The crowned splines are employed to permit limited radial floating action of the ratchet which may be required in coupling and decoupling operations to accommodate variations in alignment.

Piston-like carrier 21 is equipped with seals 32 to prevent leakage of fluid from the cylindrical chamber 22 during use of the apparatus. One end of carrier 21 has an adapter ring 33 for engagement by an end of spring 34, the opposite end of which engages a shoulder 35 on body 23. Spring 34 tends to move carrier 21 and consequently everything, including ratchet 15, connected therewith in a decoupling direction. All of these parts are moved in the opposite direction against the force of the spring by fluid, either compressible or incompressible, supplied under pressure to the end of cylinder 22 via port 36 when the apparatus is to be coupled to perform a driving operation. It will be noted that the end of the second tubular piece 28 is beveled or tapered, as at 37, to permit easy entrance of the ratchet 15 into the housing 14 when the pawls 17 occupy their innermost positions which are determined by the stop means 20. As previously pointed out, springs 19 urge the pawls toward such positions so that when the ratchet is moved into the housing 14 the pawls will engage teeth 18 and effect a driving engagement of the clutch.

In the event the driven element 12 should tend to revolve faster than the driving element 11, the pawls will ride over the teeth 18 in a ratcheting operation.

When it is desired to operate the driving element 11 without transmitting motion to the driven element 12, the cylinder 22 may be connected with a sump, or the atmosphere, and spring 34 will move piston 21 and consequently ratchet 15 to positions in which radial registration of ratchet 15 with pawls 17 will be interrupted. The apparatus then occupies a decoupled state in which it will remain until fluid pressure is again supplied to cylinder 22.

Suitable sealing means 38, 39 may be employed wherever found desirable or necessary.

While a single embodiment of the invention has been illustrated and described, it should be obvious that numerous changes in the structure and relation of various parts may be made without departing from the spirit and scope of the invention.

We claim:

1. Apparatus for coupling and decoupling driving and driven elements, comprising:
   a. pawl and ratchet type clutch means having complemental parts on said driving and driven elements, at least one of said parts being provided with members movable in a plane substantially radial to the axes of said elements to engage the other part and effect a driving relation between said elements, one part of said clutch means being movable axially relative to one of said elements;
   b. means for moving said one part axially of said one element to interrupt and reestablish radial registration of said members with said other part of said clutch means; and
   c. resilient means for urging in one direction said means for moving said one part axially of said one element.

2. The apparatus for coupling and decoupling driving and driven elements of claim 1 in which the pawls of the clutch are carried by the driven element and are movable in a plane substantially radial to the axis of the driven element to engage and disengage the ratchet.

3. The apparatus for coupling and decoupling driving and driven elements of claim 1 in which the ratchet is carried by the driving element and is mounted for axial movement relative thereto.

4. The apparatus for coupling and decoupling driving and driven elements of claim 3 in which the driven element has a housing and the pawls of the clutch are pivoted therein for movement in a plane radial to the axes of the elements to engage with and disengage from the ratchet.

5. The apparatus for coupling and decoupling driving and driven elements of claim 4 in which resilient means are provided to urge the pawls in one direction.

6. Apparatus for coupling and decoupling driving an driven elements, comprising:
   pawl and ratchet clutch means having complemental pawl and ratchet parts respectively on said driven and driving elements, said pawl part being provided with pawls movable in a plane substantially radial to the axes of said elements to engage the ratchet and effect a driving relation between said elements, one of said parts being movable axially relative to the other of said parts, said ratchet being mounted on the driving element for limited radial self-aligning movement; and
   means for moving said one part axially to interrupt and reestablish radial registration of said one part with said other part of said clutch means.

7. Apparatus for coupling and decoupling driving and driven elements, comprising:
   pawl and ratchet type clutch means having complemental parts on said driving and driven elements, at least one of said parts being provided with members movable in a plane substantially radial to the axes of said elements to engage the other part and effect a driving relation between said elements, one part of said clutch means being movable axially relative to one of said elements;
   means for moving said one part axially of said one element to interrupt and reestablish radial registration of said members with said other part of said clutch means;
   a piston supported for rotary movement and carrying the ratchet; and
   a cylinder receiving the piston for axial movement therein.

8. The apparatus for coupling and decoupling driving and driven elements of claim 7 in which resilient means are provided to urge said piston in one direction in said cylinder and means are provided to introduce fluid under pressure into said cylinder to move said piston in opposition to said resilient means.

9. The apparatus for coupling and decoupling driving and driven elements of claim 7 in which the piston is connected with the driving element in a manner to provide limited radial floating movement of the piston and ratchet and eaxy coupling action.

10. Apparatus for coupling and decoupling driving and driven elements, comprising:
   pawl and ratchet type clutch means having complemental parts on said driving and driven elements, at least one of said parts being provided with members movable in a plane substantially radial to the axes of said elements to engage the other part and effect a driving relation between said elements, one part of said clutch means being movable axially relative to one of said elements;

means for moving said one part axially of said one element to interrupt and reestablish radial registration of said members with said other part of said clutch means;

a piston supported for rotary movement and carrying the ratchet; and a cylinder receiving the piston for axial movement therein, said piston being connected with the driving element in a manner to provide limited radial floating movement of the piston and ratchet and easy coupling action, said radial floating movement of the piston and ratchet is secured by providing crowned splines between the driving element and the piston and ratchet.

* * * * *